United States Patent [19]

Casberg

[11] Patent Number: 4,928,813
[45] Date of Patent: May 29, 1990

[54] ENCASED POOL CHEMICAL CAPSULE WITH EXTENDED ENDS AND METHOD OF MAKING THE SAME

[75] Inventor: John M. Casberg, Cheshire, Conn.

[73] Assignee: Olin Corporation, Cheshire, Conn.

[21] Appl. No.: 360,666

[22] Filed: Jun. 2, 1989

[51] Int. Cl.$^5$ .................... B65D 85/62; C02B 1/18
[52] U.S. Cl. .......................... 206/0.5; 4/496;
   53/442; 206/497; 210/169; 422/265
[58] Field of Search .............. 4/228, 496; 53/397,
   53/442; 206/0.5, 445, 497; 210/169, 198.1;
   422/263-265

[56] References Cited

U.S. PATENT DOCUMENTS

| | | | |
|---|---|---|---|
| 1,931,765 | 10/1933 | Leever | 53/3 |
| 2,826,484 | 3/1958 | Buehler | 23/267 |
| 2,976,129 | 3/1961 | Buehler | 23/267 |
| 2,997,160 | 8/1961 | Marshall | 206/0.5 |
| 3,012,657 | 12/1961 | Roe | 206/0.5 |
| 3,047,370 | 7/1962 | Aytges et al. | 23/252 |
| 3,199,665 | 8/1965 | Eriksson | 206/0.5 |
| 3,483,989 | 12/1969 | Gopstein | 210/242 |
| 3,607,103 | 9/1971 | Kiefer | 23/267 A |
| 3,620,759 | 11/1971 | Maddox | 99/78 |
| 3,823,816 | 7/1974 | Controulis et al. | 206/0.5 |
| 3,856,932 | 12/1974 | May | 424/16 |
| 3,937,399 | 2/1976 | Halley | 210/169 |
| 4,040,515 | 8/1977 | Hessel et al. | 206/0.5 |
| 4,241,025 | 12/1980 | Grayson, IV et al. | 422/264 |
| 4,374,563 | 2/1983 | Alexander | 206/499 |
| 4,435,858 | 3/1984 | Dolan | 4/228 |
| 4,546,503 | 10/1985 | Caseberg | 4/496 |
| 4,643,881 | 2/1987 | Alexander | 422/265 |
| 4,825,528 | 5/1989 | Nicholson et al. | 422/264 |

FOREIGN PATENT DOCUMENTS 0439506 12/1935 United Kingdom .

Primary Examiner—Jimmy G. Foster
Attorney, Agent, or Firm—Ralph D'Alessandro; Bruce E. Burdick

[57] ABSTRACT

A capsule and a method of making a capsule for use in the dissolution of a chlorine chemical compound into a body of water. The capsule comprises a tablet section having at least one chlorine compound tablet and a shell securely fitted about the tablet section. The shell has two apertures at opposite ends, each extension extending away from the tablet section and having a conduit communicating with an aperture to reduce the dissolving rate of the chlorine into the water. The ends of the extensions may be shaped to prevent the capsule from standing on its ends.

17 Claims, 3 Drawing Sheets

ENCASED POOL CHEMICAL CAPSULE WITH EXTENDED ENDS AND METHOD OF MAKING THE SAME

This invention relates generally to a package for dispensing a water sanitizing chemical. More specifically, it relates to a halogen containing compound that is encased in a tightly fitting material which has openings on opposing ends to permit dissolution of the halogen compound containing chemical.

A persistent problem in treating bodies of water with sanitizing chemicals has been the ability to provide a dispensing package that permits uniform distribution of an available halogen, such as chlorine, into the surrounding body of water over a predetermined period of time in a simple and reliable manner. Attempts to simply obtain this uniform distribution from dispensing packages for water sanitizing chemicals have led to the use of pressed tablets in forms varying from sticks to elliptical briquettes to circular or generally cylindrical blocks. Means have been devised to meter the sanitizing chemical whatever its form into the surrounding water.

Some of these metering means have included the use of a porous matrix of material to secure the chemical tablets and enclosing the porous matrix material and chemical tablets with a water impermeable synthetic material on the top and sides. Water permeates the porous underside of the matrix by osmosis and gradually dissolves the available sanitizing chemical into the surrounding water. However, an approach such as this has little control over the dissolving rate of the packaged chemicals.

Another approach uses a tablet of available chlorine containing compound that has two substantially parallel faces secured to a generally perpendicular cylindrical exterior surface that is covered with an impervious film secured to the tablet by means of a suitable adhesive. One of the parallel plane faces could also be covered by this same impervious material. This simple dispensing package is effective, but tends to be relatively costly because of the adhesive and results in an overly fast dissolving rate of the sanitizing chemical when calcium hypochlorite is employed.

Shrink wrap material, either water shrinkable or heat shrinkable, has been employed in an attempt to provide a simpler, less costly means of adhering a covering to the water sanitizing chemical. One approach uses heat shrinkable material to encase a plurality of tablets which could be cut to the desired length and placed in a strainer basket of a swimming pool skimmer unit. This provides a generally uniform dissolving rate but, apparently because of the flat ends, results in a relatively rapid dissolution of the encased sanitizing chemical.

U.S. patent application No. 191,640, filed May 9, 1988 entitled "Encased Pool Chemical Tablet With Domed ends" by Casberg et al, which is assigned to the same assignee as herein and is incorporated by reference in its entirety herein, discloses and elongate tablet of halogen compound containing a chemical having a length longer than its thickness with an elongate central section connecting two opposing obliquely and inwardly tapered ends encased in an elongate tablet shell having a corresponding elongate central section connecting two opposing obliquely and inwardly tapered ends which have openings therein. The encased halogen compound containing chemical tablet is especially intended for use within a skimmer unit in a forced water circulation system, such as is used with swimming pools.

It is an object of the present invention to provide a package for a water sanitizing chemical that permits the chemical to dissolve uniformly and over a substantially longer period of time under identical conditions than prior packaging designs.

It is another object of the present invention to provide packaging for a water sanitizing chemical that permits the chemical to be simply handled and dispensed by consumers.

It is another object of the present invention to provide a package for a water sanitizing chemical that substantially prevents the package from standing on its ends.

It is another object of the present invention to provide a package for a water sanitizing chemical that has a protective shell with water access conduits of an extended length, the conduits having a reduced area flow path to increase and control dissolving time of the chemical in the shell.

The foregoing problems are overcome and other advantages are provided by a capsule for use in the dissolution of a halogen chemical compound into a body of water having an exterior shell with two end extensions having conduits therethrough.

In accordance with one embodiment of the invention, a capsule for use in the dissolution of a halogen chemical compound into a body of water is provided. The capsule generally comprises a tablet section and a shell means. The tablet section comprises at least one halogen chemical compound tablet. The tablet section has an elongate center section with two opposite end sections. The shell means is securely fitted about the tablet section. The shell means has an elongate center portion substantially encasing the tablet section and two end portions adjacent the tablet end sections. Each of the end portions comprises a tablet wall with an aperture therethrough and an extension having a conduit means or flow passage therethrough. The extensions are relatively smaller in cross sectional area and shape than the center portion and extend away from the tablet section in substantially opposite directions. This causes water to pass through the extensions and the apertures to access the tablet section such that the shell means reduces the dissolving rate of the halogen compound into a body of water with the halogen compound being dissolved into a body of water at a relatively constant rate.

In accordance with another embodiment of the invention, a capsule is provided comprising a tablet section and a shell. The tablet section comprises at least one halogen chemical compound tablet. The tablet section has an elongate center section with two opposite end sections. The shell comprises a heat shrinkable tube securely fitted about the tablet section. The tube forms an elongate center section substantially encasing the tablet section and two angled end portions extending away from the center portion in opposite directions with relatively smaller cross sectional shapes than the center portion.

In accordance with one method of the invention, a method of manufacturing a capsule for use in the dissolution of a halogen chemical compound into a body of water is provided. The method comprises the steps of positioning a halogen compound tablet into a heat shrinkable tubing; and shrinking the tubing about the tablet such that the tablet is substantially encased by the tubing except for a first end extension and a second end extension of the tubing extending away from the tablet and providing reduced size conduits for providing water access to the tablet.

The foregoing aspects and other features of the invention are explained in the following description, taken in connection with the accompanying drawings, wherein.

Figure 1:
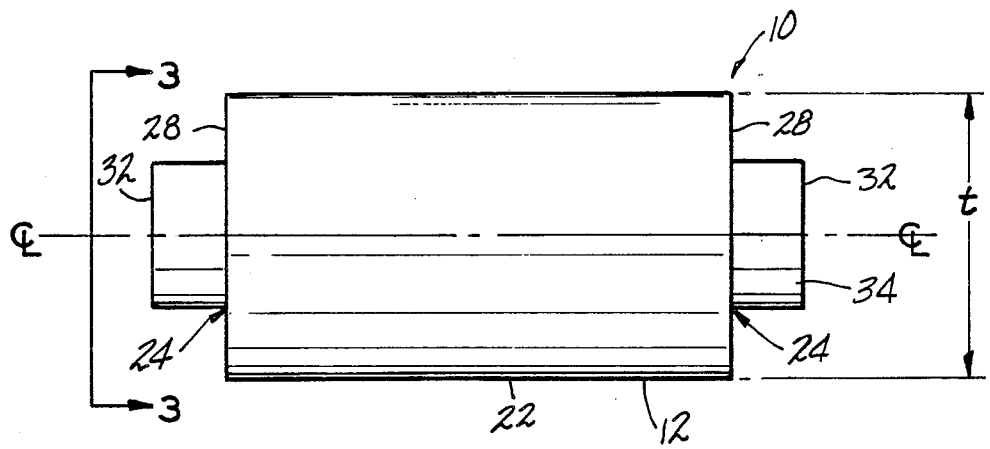
FIG. 1 is a side elevational view of a capsule incorporating the features of the present invention.
Figure 2:
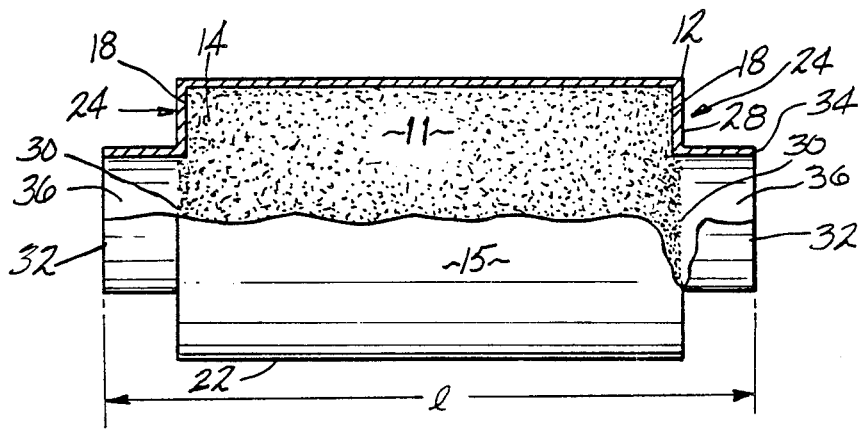
FIG. 2 is a side elevational view of the capsule shown in FIG. 1 with a portion of the encasing material and the capsule cut away.
Figure 3:
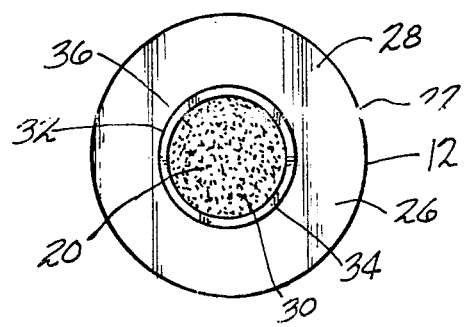
FIG. 3 is an end elevational view of the capsule shown in FIG. 1.

Referring to FIGS. 1, 2 and 3 there is shown one embodiment of an encased tablet or capsule 10 incorporating features of the present invention. In the embodiment shown, the capsule 10 generally comprises a tablet section 11 and a shell 12. The encased tablet 10, in the embodiment shown, has a general cylindrical shape with a thickness or diameter t and a length 1. The tablet section 11 is generally comprised of a compressed granular material such as calcium hypochlorite. However, any suitable material, such as a halogen compound, may be used. The tablet section 11, in the embodiment shown, is comprised of one tablet 14 having a generally cylindrical shape with an elongate center section 16 and two opposite ends 18. In the embodiment shown, the ends 18 are substantially flat. However, in alternate embodiments of the invention, the ends 18 and 20 may be provided with any suitable shape. In addition, the tablet section 11 may be comprised of more than one tablet placed end to end in contiguous fashion.

The shell 12 may be made from any suitable type of material. However, in a preferred embodiment, a shrink wrap plastic material is used as the encasing shell. It has been found that heat shrinkable wrap such as clear, semirigid polyvinyl chloride may be used. A satisfactory thickness for the shrink wrap material has been about 3 mils supplied with flat dimension of about 83 to 90 millimeters and a length of about 137 to about 142 millimeters with a minimum shrink of about 55 percent. An acceptable range for the thickness of the shrink wrap material is about 1.0 to about 12.0 mils. The shell can extend by as much as about 0.2 to about 1.0 inches or more beyond each end tablet end wall 28.

The shell 12 generally comprises an elongate center portion 22 and two end portions indicated generally by the numeral 24. The center portion 22 is generally securely fitted about the tablet section 11. The end portion 24 comprises a tablet section end wall 28 having an aperture 30 passing therethrough and an extension section 32. A preferred size for the apertures 30 in the shrink wrap material used to form the shell is about 1.18 inch diameter, with an acceptable range of about 0.9 to about 1.40 inches in diameter. Although other configurations, such as oval or any polygonal shape such as square, rectangular, or pentagonal, could be employed, a circular opening shape is preferred.

The extension sections 32, as described above, generally extend away from the tablet section 11, in substantially opposite directions, from the ends 18 of the tablet 14. The extension sections 32 each comprise a conduit wall 34 forming a conduit 36 between the apertures 30 and the exterior of the capsule 10. In the embodiment shown, the conduit wall 34 forms a circular conduit or flow passage 36.

However, any suitable shape of conduit may be provided. In addition, any suitable length or width of conduit may be provided as well as, in an alternate embodiment, a plurality of conduits. The conduit walls 34 are generally about twice the thickness of the shrink wrap material as a result of the shrinking of the diameter after shrinking of the shrink wrap, but optimally is about 6 mils thick. The conduit walls 34 could be from about 2 to about 24 mils, but more preferably are about 3 to about 12 mils thick. The conduits 36, as stated above, are generally circular, but in alternate embodiments of the invention may be oval or any polygonal shape such as square, rectangular, or pentagonal.

The sanitizing chemical or halogen compound containing tablet, in this instance chlorine, has been formed as previously mentioned with a cylindrical elongate central section with flat ends. The weight optimally has been about 345 grams with a preferred central section diameter of about 2.01 inches and a preferred length of about 3.54 inches. The weight can range from about 298 to about 360 grams and the length can vary from about 3.10 to about 3.98 inches. The density of the tablet optimally can be from about 1.85 to about 1.95 grams per cubic centimeter with a hardness of about 350 pounds. A typical chemical composition of the chlorine compound containing chemical has been about 98.5 percent commercial grade calcium hypochlorite with about 1.5 percent powdered lime added. Percentages can range from about 98.3 to about 98.7 percent calcium hypochlorite and about 1.3 to about 1.7 percent powdered lime added. In alternate embodiment of the invention, the tablet or tablet section 11 may have any suitable shape such as square, rectangular, pentagonal or oval. In addition, the ends 18 may be any suitable shape. The halogen compound containing tablet section 11 can also contain multiple tablets contiguously positioned in end to end fashion, ranging from 2 to any suitable number compatible with the desired dissolving time, skimmer unit size and desired available chlorine level.

In the embodiment shown, the tablet 14 is intended to be dissolved into a surrounding body of water over a period of time with a relatively constant dissolving rate. Water is generally allowed to enter the encased tablet 10 only via the conduits 36. Once in the tablet section 11, the water can dissolve the tablet 14 and exit the encased tablet 10 with dissolved chemicals back through the conduits 36. In the embodiment shown, in order to facilitate a relatively constant or even dissolution rate, the apertures 30 and the conduits 36 are generally centered proximate the ends 18 of the tablet 14. However, in an alternate embodiment of the invention, any suitable position of the apertures 30 and conduits 36 may be provided. The conduits 36 are generally capable of reducing the rate at which the tablet 14 is dissolved by the body of surrounding water. In addition, the conduits 36 also allow the rate of dissolution of the tablet 14 to be relatively constant or even. This occurs because the water must first pass through the conduits 36 in order to dissolve the tablet 14 it. However, water having already contacted the tablet 14 and containing dissolved chemicals therein is already present in the conduit 36. This delays the time in which water not having dissolved chemicals therein can access the tablet 14 and reduces the rate at which water having already accessed the tablet 14 and having dissolved chemicals therein can exit the conduits 36. This reduces the dissolution rate of the capsule 14 and provides a relatively even or constant dissolution rate.

Figure 4:
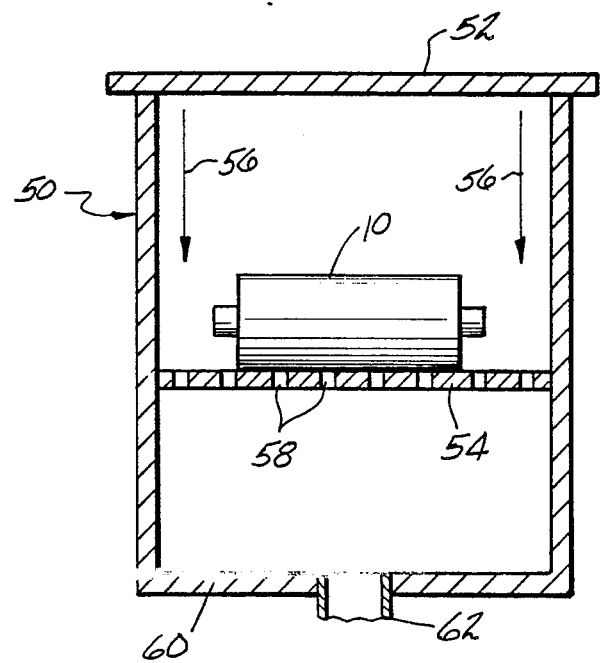
FIG. 4 is a cross sectional view of a skimmer unit with a capsule placed on its side in the skimmer unit which is connected to a pool via a flow loop with forced water circulation.

The capsule 10 is intended to be used lying on its side as shown in FIG. 1. As shown in FIG. 4, the encased tablet 10 can generally be used in a skimmer unit, indicated generally by the numeral 50, that is connected to a forced water circulation system as part of a recirculation loop to a swimming pool. The skimmer generally has a top 52 that is removable to permit the capsule to be placed on a support shelf 54 in the skimmer. Forced water circulates through the flow loop and enters the skimmer unit so that it flows in a generally vertically downwardly direction 56. The water will generally pass around the encased tablet 10 through the holes 58 in the support shelf 54 and continue to flow toward the bottom 60 of the skimmer where it exits through a skimmer outlet pipe 62 en route to the pool's forced circulation pump (not shown).

Although a majority of water passes around the encased tablet 10, a portion of the water will enter into the capsule through the conduits 36 and a portion of water in the conduits 36 having dissolved chemicals therein will exit the conduits. This side orientation of the capsule relative to the flow of water and the extensions 32 combine to control dissolution of the tablet 14 as well as reduce the rate of dissolution. However, if an encased tablet 10 were to accidentally land and remain positioned on one of its ends, the dissolving rate can be very different from when it lands on its side. The extensions 32 substantially prevent a capsule from landing on its end.

The size of the openings or apertures 30 in the shell 12 encasing the tablet 14 helps determine the dissolving rate of the sanitizing chemical, in addition to the size, shape, and solubility of the tablet. The encased tablet 10 has been designed to last about 4 to about 7 days time in a 10,000 gallon pool with eight (08) hours per day of forced water circulation when placed in a typical commercial in ground pool skimmer unit, such as a Hayward Model SP 1082 or Model SP 1084. A 20,000 gallon pool requires two encased tablets 10 and a 30,000 gallon pool requires three encased tablets 10 for the desired time period.

The encased tablet 10, because of being exposed only through the apertures 30 on the opposing ends, dissolves more slowly when the circulating pump in the forced circulation system is off. This is significant since the preferred sanitizing chemical is granular calcium hypochlorite, which is a relatively fast dissolving chemical that, prior to the present invention, even in tablet form would dissolve too quickly, lasting only about a day.

In order to exemplify the results achieved, the following Example is provided without any intent to limit the scope of the instant invention to the discussion therein. The Example is intended to compare the dissolving rate of the encased tablets or capsules with the same weight of calcium hypochlorite under the same conditions of pool size, water temperature, water circulation rate and water circulation time in a pool skimmer unit. The only difference between the two encased tablets is the addition of extensions 32 to the tablet shells of one of the encased tablets.

EXAMPLE

Granular calcium hypochlorite was pressed at 20 tons pressure in a die and press to form six tablets. Each of the tablets were about 2.01 inches in diameter, 115 grams in weight, about 1.18 inches in height, containing HTH ® brand calcium hypochlorite with 1.5% lime added. Three tablets were placed end to end in a three mil thick PVC shrink tubing. The tubing was shrunk to form a first packaged tablet or capsule. Three other tablets were placed end to end in a three mil thick PVC shrink tubing which was also shrunk to form a second packaged tablet or capsule. The apertures at each end of the capsules were 1 3/16 inches in diameter, but with one package the shrink tubing extended 0.5 inches beyond each end of the tablets. The two encased tablets were both individually placed horizontally in an in-ground pool-sized Hayward Model SP 1084 skimmer unit connected to 110 gallon tanks. Water at 85° F. was circulated through each skimmer unit at 20 gpm for 8 hours per day. Each day the tanks were refilled with fresh water, but the encapsulated tablets were constantly kept under water. The results are given in the following table.

TABLE 1

| TIME (DAYS) | HTH(R) DISSOLVED-VERSUS TIME | |
|---|---|---|
| | HTH DISSOLVED (OUNCES) | |
| | NO EXTENSION | ½" EXTENSIONS |
| 0 | 0 | 0 |
| 0.15 | 0.78 | — |
| 0.18 | — | 1.0 |
| 0.33 | 1.56 | 1.2 |
| 1.0 | 3.12 | 2.4 |
| 1.1 | — | 3.0 |
| 1.17 | 4.08 | — |
| 1.18 | — | 3.4 |
| 1.33 | 5.25 | 4.1 |
| 2.0 | 6.90 | 5.4 |
| 2.15 | — | 6.2 |
| 2.19 | 8.94 | — |
| 2.33 | 10.01 | 7.1 |
| 3.0 | — | 8.7 |
| 3.16 | 11.47 | — |
| 3.17 | — | 9.9 |
| 3.22 | 12.15* | — |
| 3.33 | | 10.2 |
| 4.0 | | 11.4 |
| 4.13 | | 11.7** |

*Tablet Dissolved
**Tablet Essentially Dissolved

Figure 5:
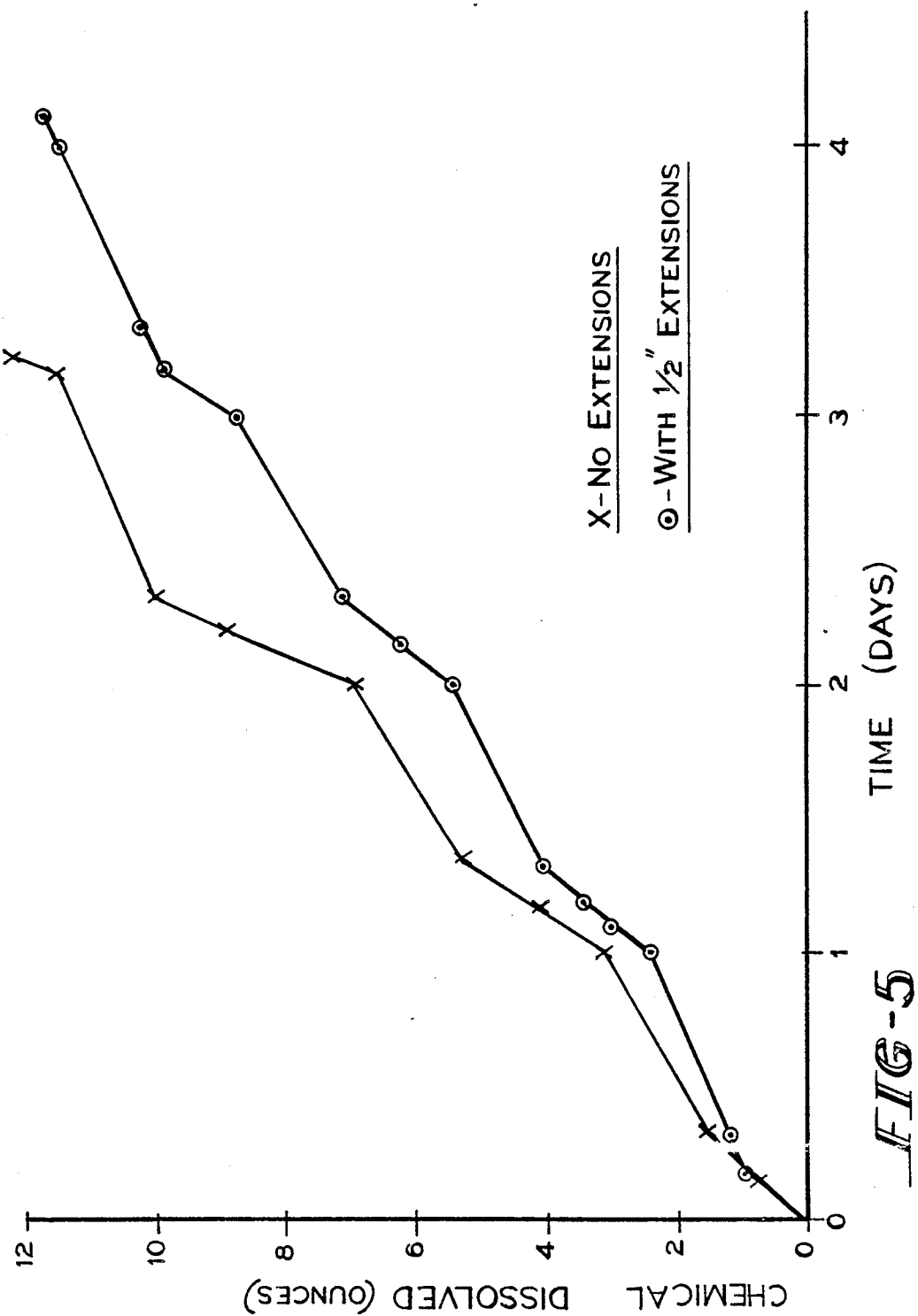
FIG. 5 is a graphical depiction of the dissolving rates of a capsule with an opening in each of its flat ends and a capsule with two extensions on each end with a single opening reflecting the weight of calcium hypochlorite dissolved over a period of time in a skimmer unit with forced circulation.

These results show that with the extensions, the dissolving time was increased by 28%. Referring also to FIG. 5, Table 1 is represented with X representing the capsule without extensions and ⊙ representing the capsule with extensions. The capsule with extensions, not only took longer to dissolve, but also dissolved at a more constant rate.

Figure 6:
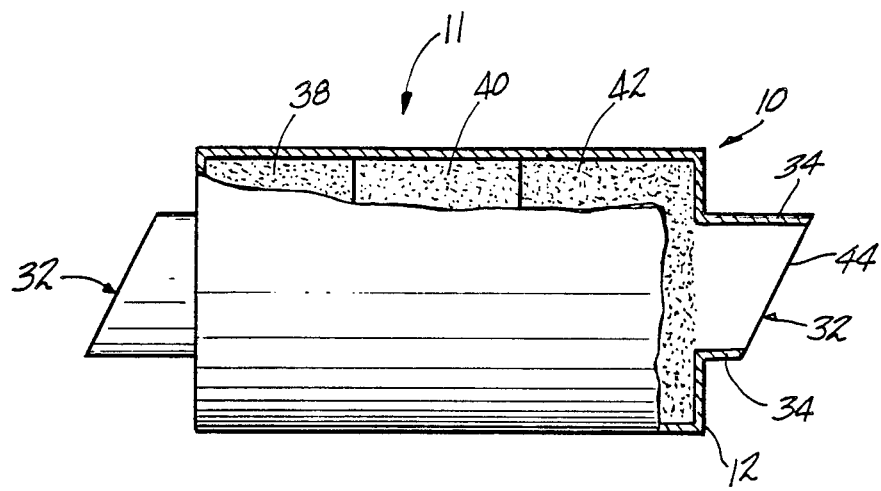
FIG. 6 is a side elevational view of a capsule having irregular extensions.

Referring now to FIG. 6, an alternate embodiment of the invention is shown, the tablet section 11 is comprised of three tablets 38, 40 and 42. The extensions 32 each comprise a conduit wall 34 with an irregular wall end 44, only one of which is shown for each. In the embodiment shown, the wall ends 44 are set at an angle to the longitudinal axis of the encased tablet 10. The irregular wall ends 44 are designed so the encased tablet 10 even accidently cannot stand on one of its ends.

One method of making the encased tablet 10 comprises heating a shrinkable tube about a halogen chemical compound tablet. Generally, a preshaped tablet or tablets are placed in a heat shrinkable tubing of suitable length. The tubing is heated, such as with a heat tunnel on a forced air heat gun, so that the tubing shrinks. A portion of the tubing substantially encases the tablet or tablets. The tubing is of suitable length such that two extensions are formed at opposite ends. The extensions, being initially formed from a tube have conduits. Because the tablet or tablets stop the tubing from shrinking at their outer surface, but not past their ends, the extensions are relatively smaller in size than the tubing surrounding the tablet section. Thus, reduced size conduits are provided in the extensions for water egress and ingress. In order to provide irregular ends to the extensions, the tubing may be cut or shaped prior to the heating of the tubing, while the shrink wrap material is hot, or cut or shaped after the tubing is shrunk.

The ratio of the length of the encased tablet to its diameter or thickness, indicated as t in FIG. 1, is also a factor that can affect the dissolving rate. Generally the smaller the ratio, the more rapidly the sanitizing chemical dissolves. A ratio that has proven desirable is one from about 1.7 to about 2.2 in combination with apertures 30 and conduits 36 of about 1.0 to about 1.20 inches diameter.

While the preferred structure in which the principles of the present invention have been incorporated is shown and described about it is to be understood that the invention is not to be limited to the particular details thus presented, but in fact, widely different means may be employed in the practice of the broader aspects of this invention. For example the chlorine containing compound used in the chemical tablet could be trichloroisocyanuric acid, sodium dichlorocyanurate or lithium hypochlorite, in addition to the previously discussed calcium hypochlorite. The sanitizing chemical could equally well be any suitable halogen containing compound that is capable of being formed into a tablet and encased as described, such as bromine which is available commercially as bromine tablets. A commercially available tablet is based on 1-bromo-3-chloro-5,5-dimethylhydantoin.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims. For example, it is to be understood that the tablet could have inwardly tapered ends and that the shell encasing it could similarly be inwardly tapered so that the shell extensions extend outwardly from the inwardly tapered ends of the shell to accomplish the same effect on the dissolving rate of a halogen, such as calcium hypochlorite, containing tablet as is obtained by the embodiments previously described.

What is claimed is:

1. A capsule for use in the dissolution of a halogen chemical compound into a body of water, the capsule comprising:
   a tablet section comprising at least one halogen chemical compound tablet, said tablet section having an elongate center section with two opposite end sections; and
   shell means securely fitted about said tablet section, said shell means having an elongate center portion substantially encasing said tablet section and two end portions adjacent said tablet end sections, each of said end portions comprising a tablet wall with an aperture therethrough and an extension having a conduit means therethrough, said extensions extending away from said tablet section in substantially opposite directions whereby water must pass through said extensions and said apertures to access said tablet section such that said shell means reduces the dissolving rate of said halogen compound into a body of water, the dissolving rate being at a relatively constant rate.

2. A capsule as in claim 1 wherein said tablet section comprises multiple tablets.

3. A capsule as in claim 1 wherein said elongate center section of said shell means is relatively cylindrical.

4. A capsule as in claim 1 wherein said halogen compound tablet is calcium hypochlorite.

5. A capsule as in claim 1 wherein said tablet end sections are relatively flat.

6. A capsule as in claim 1 wherein said apertures are about one third the size of the length of said tablet section measured along the longitudinal axis.

7. A capsule as in claim 1 wherein said extensions are about 0.5 inches long.

8. A capsule as in claim 7 wherein each of said conduit means comprises one conduit about 1 3/16 inches in diameter.

9. A capsule as in claim 1 wherein said extensions have first ends proximate said apertures and second ends spaced from said apertures, said second ends having an irregular shape to substantially prevent a capsule from standing on its ends.

10. A capsule as in claim 1 wherein said shell means is comprised of a shrink wrap material.

11. A capsule for use in the dissolution of a halogen chemical compound into a body of water, the capsule comprising:
    a tablet section comprising at least one halogen chemical compound tablet, said tablet section having an elongate center section with two opposite end sections; and
    a shell comprising a heat shrinkable tube securely fitted about said tablet section, said tube forming an elongate center portion substantially encasing said tablet section and two end portions extending away from said center portion in opposite directions with relatively smaller cross-sectional shapes than said center portion.

12. A capsule as in claim wherein said tube has irregular ends to prevent the capsule from standing on said tube.

13. A capsule as in claim 11 wherein said tube is a 3 mil thick PVC shrink tubing that is shrunk onto at least one tablet to form the capsule.

14. A capsule as in claim 13 wherein said tablet section comprises three tablets, each tablet about 2.01 inches in diameter and 1.18 inches in height, placed end to end.

15. A method of manufacturing a capsule for use in the dissolution of a halogen chemical compound into a body of water, the method comprising the steps of:
    positioning a halogen compound tablet into a heat shrinkable tubing; and
    shrinking the tubing about the tablet such that the tablet is substantially encased by the tubing except for a first end extension and a second end extension of the tubing extending away from the tablet and providing reduced size conduits for providing water access to the tablet.

16. A method as in claim 15 further comprising the step of cutting the tubing such that it has two ends proximate the tablet and shaping the ends of the tubing to provide an irregular shape to substantially prevent the capsule from standing on the ends.

17. A method as in claim 15 wherein the tablet has a cylindrical shape and is positioned in the tubing with a central axis of the tablet substantially aligned with a central axis of the tubing.

* * * * *

UNITED STATES PATENT AND TRADEMARK OFFICE
CERTIFICATE OF CORRECTION

PATENT NO. : 4,928,813
DATED : May 29, 1990
INVENTOR(S) : Casberg

It is certified that error appears in the above—identified patent and that said Letters Patent is hereby corrected as shown below:

In Column 8 at line 52, after "claim" and before "wherein" insert --11--.

Signed and Sealed this

Twenty-first Day of July, 1992

Attest:

DOUGLAS B. COMER

*Attesting Officer*  *Acting Commissioner of Patents and Trademarks*